(12) United States Patent
Pattakos et al.

(10) Patent No.: US 9,841,088 B2
(45) Date of Patent: Dec. 12, 2017

(54) CONTINUOUSLY VARIABLE TRANSMISSION

(71) Applicants: Manousos Pattakos, Nikea Piraeus (GR); Efthimios Pattakos, Nikea Piraeus (GR); Emmanouel Pattakos, Nikea Piraeus (GR)

(72) Inventors: Manousos Pattakos, Nikea Piraeus (GR); Efthimios Pattakos, Nikea Piraeus (GR); Emmanouel Pattakos, Nikea Piraeus (GR)

( * ) Notice: Subject to any disclaimer, the term of this patent is extended or adjusted under 35 U.S.C. 154(b) by 305 days.

(21) Appl. No.: 14/675,780

(22) Filed: Apr. 1, 2015

(65) Prior Publication Data

US 2015/0276027 A1    Oct. 1, 2015

(30) Foreign Application Priority Data

Apr. 1, 2014 (GB) ................................. 1405823.4
Apr. 29, 2014 (GB) ................................. 1407498.3

(51) Int. Cl.
*F16H 9/04* (2006.01)
*F16H 9/16* (2006.01)
*F16H 63/06* (2006.01)

(52) U.S. Cl.
CPC .............. *F16H 9/16* (2013.01); *F16H 63/067* (2013.01)

(58) Field of Classification Search
CPC .................. F16H 9/16; F16H 2009/163; F16H 2009/166; F16H 9/18; F16H 9/20; F16H 63/067
USPC ....... 474/29–31, 109, 119–122; 180/366, 364
See application file for complete search history.

(56) References Cited

U.S. PATENT DOCUMENTS

| | | | | |
|---|---|---|---|---|
| 1,890,500 A | * | 12/1932 | DeHuff | F16H 9/16 474/31 |
| 2,488,765 A | * | 11/1949 | Couse | F16H 7/0827 474/110 |
| 4,128,017 A | * | 12/1978 | Clarke | A01D 34/6806 474/27 |
| 6,126,562 A | * | 10/2000 | Brangenfeldt | F16H 7/0838 474/101 |
| 8,958,961 B2 | * | 2/2015 | Dec | F16H 63/062 474/29 |

* cited by examiner

*Primary Examiner* — William Gilbert

(57) ABSTRACT

A controllable Continuously Variable Transmission, of the V-belt type, wherein an auxiliary belt surrounds the V-belt at the one pulley side; a lever—having free rollers around which the auxiliary belt rides—controls, through the auxiliary belt, the transmission ratio.

10 Claims, 19 Drawing Sheets

CONTINUOUSLY VARIABLE TRANSMISSION

BACKGROUND ART

The state-of-the-art automatic CVT used in vehicles (like scooters, cars etc) comprises a pair of pulleys, each pulley made up of two, conical, sliding halves with a fixed length V-belt running between them. The engine drives the one pulley; the other pulley drives the wheel(s). When the one pulley closes up, the belt has to force the other pulley apart. When the one pulley's halves are forced completely together, the halves of the other pulley are forced completely apart.

As the pulleys move apart and close together, the gearing varies continuously.

In some CVT's of the state-of-the-art the gear ratio shifts automatically by the variator. The variator is a disc-shaped assembly fitted to the same shaft as the first pulley. It has a sloped section and carries a number of weights in a cage around the disc. As the variator assembly spins, the weights react to the centrifugal force and try to move outwards. As they do so, the weights climb the ramp and force the first pulley to close, which in turn forces the second pulley to open and this raises the gearing. When the throttle closes, the centrifugal force is reduced and the weights drop back, allowing the first pulley to open slightly, which allows the belt to ride lower within the two halves of the first pulley, which in turn allows the second pulley to close up and so the gear ratio lowers.

The driver (or the user in general) has not the option to select the transmission ratio of his desire. The tuning of the CVT in the factory (geometry of the pulleys/belt/variator, mass of the weights, springs used etc) is a compromise for:
relatively acceptable fuel efficiency (mileage),
relatively acceptable acceleration,
relatively acceptable final speed,
relatively acceptable reliability,
relatively acceptable climbing ability,
relatively acceptable operation etc.

However the user of the CVT may have different priorities, or priorities that vary depending on the instant conditions (traffic, gradient of the road, opposite wind, need for quiet operation, need for top acceleration etc).

This explains the demand for aftermarket variators. With a different, or a modified, variator the CVT operates/behaves differently. By putting heavier weights in the same variator, the revs of engagement drop, the vehicle runs quieter at lower revs, the mileage increases, the CVT is more reliable; however the acceleration drops, an opposite wind or a steep uphill may become significant problems, etc. By putting lighter weights in the same variator, the revs of engagement increase, the vehicle accelerates faster, the climbing on a steep uphill is easy, the strong opposite wind is not a problem; on the other hand the noise increases, the mileage drops, the time between overhauls drops.

The problem comes from the fact that today the rider/driver/user of the typical "automatic" CVT has not the option to substantially vary the operational characteristics of the CVT "on-the-fly". The low cost automatic CVT's of the art are of the type: "take it, or leave it"; the user/rider has to adapt himself to the characteristics of the CVT, not the opposite.

It is an object of the present invention to address the above disadvantages. Accordingly, there is provided a simple, reliable and efficient mechanism for the control of the V-belt CVT's as defined in the appended claims.

DETAILED DESCRIPTION OF THE DRAWINGS

Figure 1:
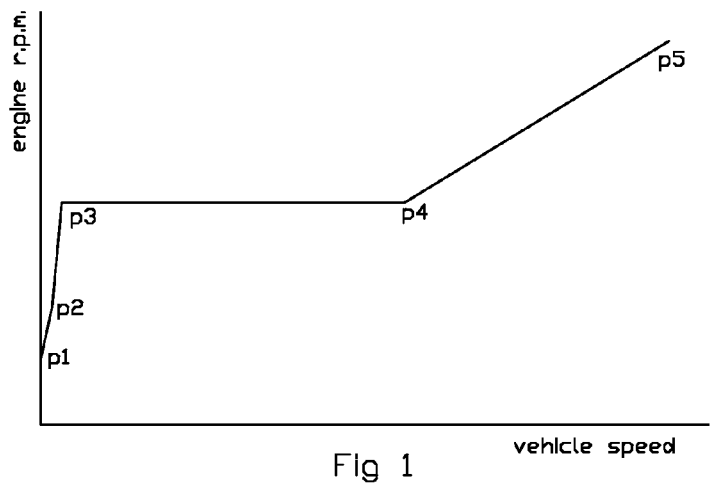
FIG. 1 shows a typical "vehicle speed versus engine R.P.M" plot of vehicles having automatic V-belt continuously transmission (CVT).

FIG. 1 shows a typical "vehicle speed vs engine revs" plot for vehicles having automatic V-belt continuously variable transmission (CVT). At the point p1 the automatic clutch starts engaging; at p2 the automatic clutch is fully engaged; from p2 to p3 the "gear ratio" remains constant and short (the revs are not yet high enough in order the variator to "overcome" the resistance of the spring of the one pulley and to cause the increase of the effective diameter of the other pulley); from p3 to p4 the centrifugal force acting on the variator weights is strong enough to enable the variator to change progressively the effective diameter of the first pulley; the transmission ratio becomes longer and longer; the vehicle speed increases without a substantial increase of the engine revs (r.p.m.); at p4 the longest transmission ratio is reached; from p4 to p5 the transmission ratio remains constant.

Figure 2:
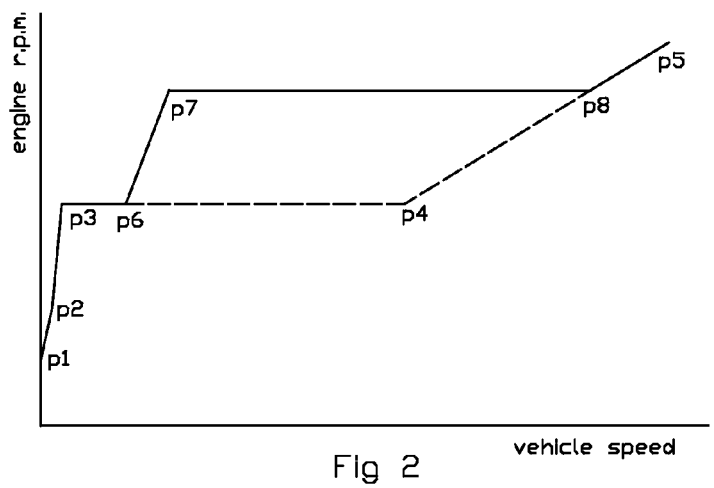
FIG. 2 shows a difference the present invention can bring to the CVT of FIG. 1.

FIG. 2 shows a difference the present invention can bring to the CVT of FIG. 1. From the point p6 to the point p7 the mechanism forbids the further increase of the effective diameter of the first pulley, which means that the transmission ratio remains short and the vehicle accelerates more quickly; from the point p7 to the point p8 the mechanism allows the progressive increase of the effective diameter of the first pulley; the engine operates near its maximum power revs; from p8 to p5 the CVT operates as the CVT of FIG. 1.

Figure 3:
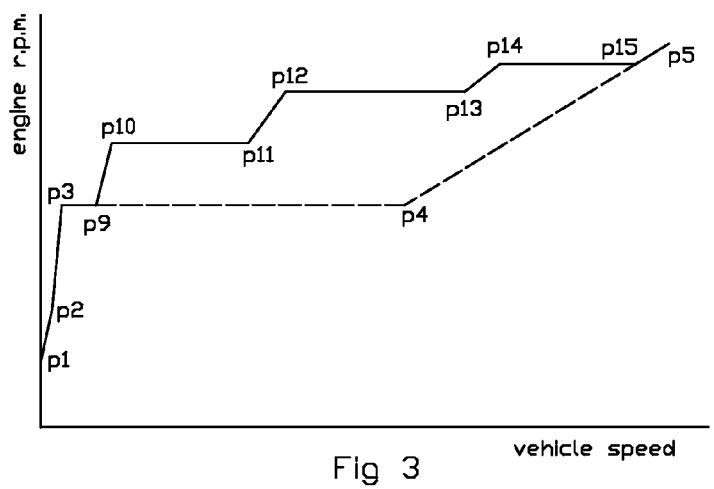
FIG. 3 shows another difference the present invention can bring to the CVT of FIG. 1.

FIG. 3 shows another difference the present invention can bring to the CVT of FIG. 1. From the p9 to p10, from the p11 to p12 and from the p13 to p14 the further increase of the effective diameter of the first pulley is blocked; the vehicle accelerates substantially faster than with the normal CVT; from p10 to p11, from p12 to p13 and from p14 to p15 the mechanism allows the progressive increase of the effective diameter of the first pulley so that the speed increases while the engine revs remain constant; the vehicle accelerates faster than with the normal CVT.

Figure 4:
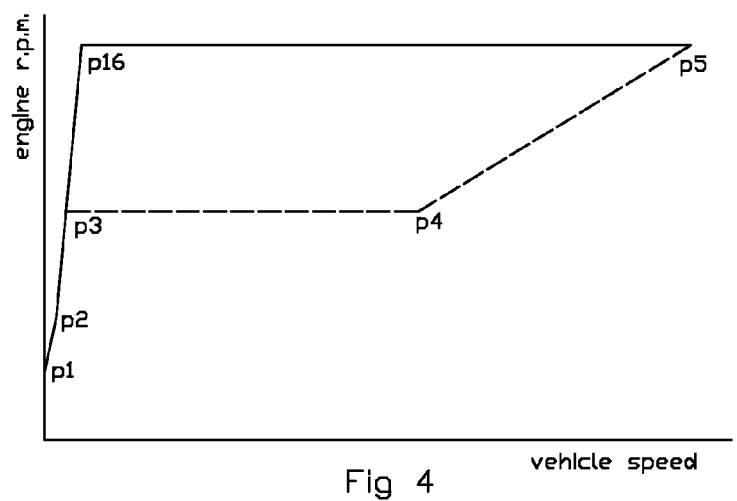
FIG. 4 shows another difference the present invention brings to the CVT of FIG. 1.

FIG. 4 shows another difference the present invention brings to the CVT of FIG. 1. The mechanism forbids the effective diameter of the first pulley to increase until the revs of the engine get high enough (point p16); then the mechanism allows the progressive increase of the effective diameter of the first pulley (p16 to p5); provided the p16 is where the engine provides its peak power, this mode gives the best possible acceleration.

Figure 5:
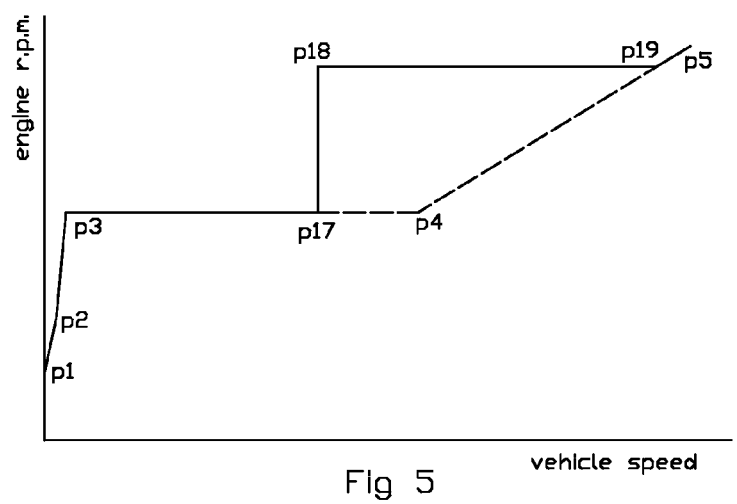
FIG. 5 shows another mode of operation.

FIG. 5 shows another mode of operation. Until the point p17 the CVT works conventionally; at the p17 the driver presses strongly the lever in order to "quickly" decrease the effective diameter of the first pulley; the transmission ratio gets substantially shorter (point p18); it is like putting a lower gear in a manual gearbox; from p18 to p19 the mechanism allows the progressive increase of the effective diameter of the first pulley so that the speed increases while the engine revs are constant.

Figure 6:
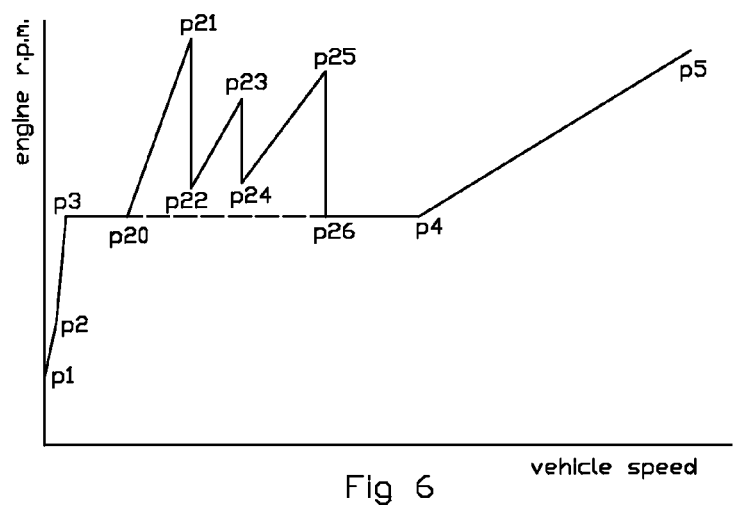
FIG. 6 shows another mode of operation.

FIG. 6 shows another mode of operation. The CVT operates conventionally until the point 20; from p20 to p21 the mechanism forbids the further increase of the effective diameter of the first pulley and the transmission ratio remains constant (like selecting the "first gear" in a manual gearbox); at p21 the mechanism releases the variator; the variator increases the effective diameter of the first pulley; the transmission ratio gets longer; the revs of the engine drop quickly; from p22 to p23 the mechanism forbids again the further increase of the effective diameter of the first pulley (like selecting the "second gear" in a manual gearbox); at p23 the mechanism releases again the variator until the p24; from p24 to p25 the mechanism forbids again the further increase of the effective diameter of the first pulley (like selecting the "third gear" in a manual gearbox); at p25 the mechanism again releases the CVT; the effective diameter of the first pulley increases; the engine revs drop; from p26 to p4 and then to p5 the CVT operates normally (i.e. the variator controls the transmission ratio until p4 wherein the CVT reaches the longest transmission ratio which remains constant until the point p5).

Figure 7:
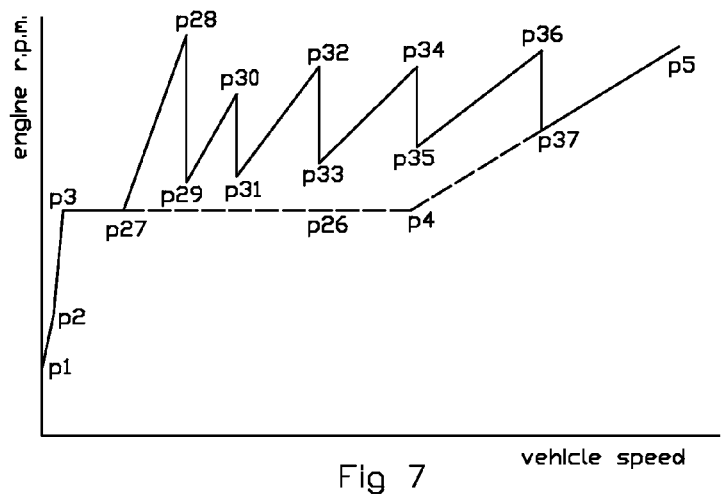
FIG. 7 shows how, by the present invention, a conventional CVT can be modified to behave, when desired, as a manual gearbox.

FIG. 7 shows how, by the present invention, a conventional CVT can be modified to behave, when desired, as a manual gearbox.

Figure 8:
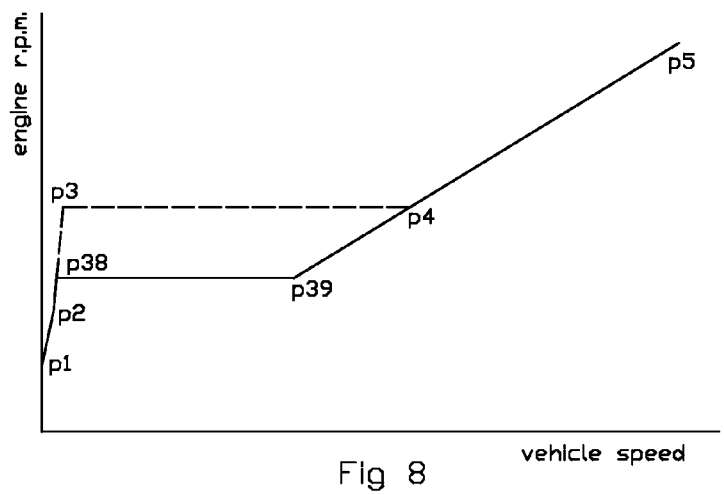
FIG. 8 shows the case wherein the variator is modified to engage sooner, for instance by heavier weights.

FIG. 8 shows the case wherein the variator is modified to engage sooner, for instance by heavier weights.

Figure 9:
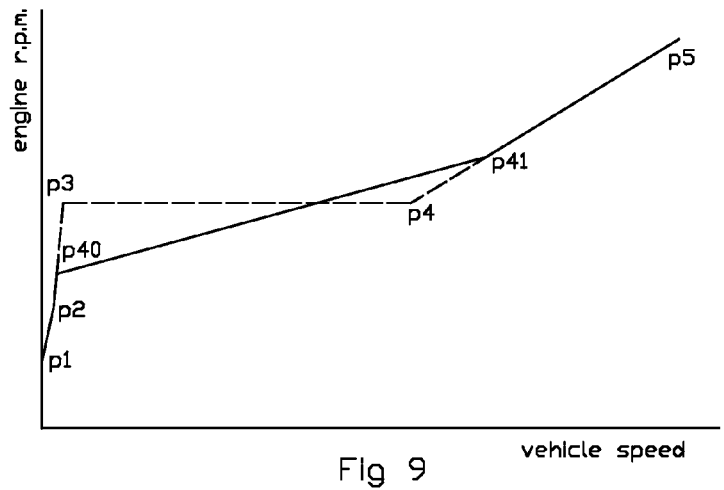
FIG. 9 shows the case wherein the variator allows a substantial increase of the engine revs as the gear ratio increases.

FIG. 9 shows the case wherein the variator allows a substantial increase of the engine revs as the gear ratio increases.

Figure 10:
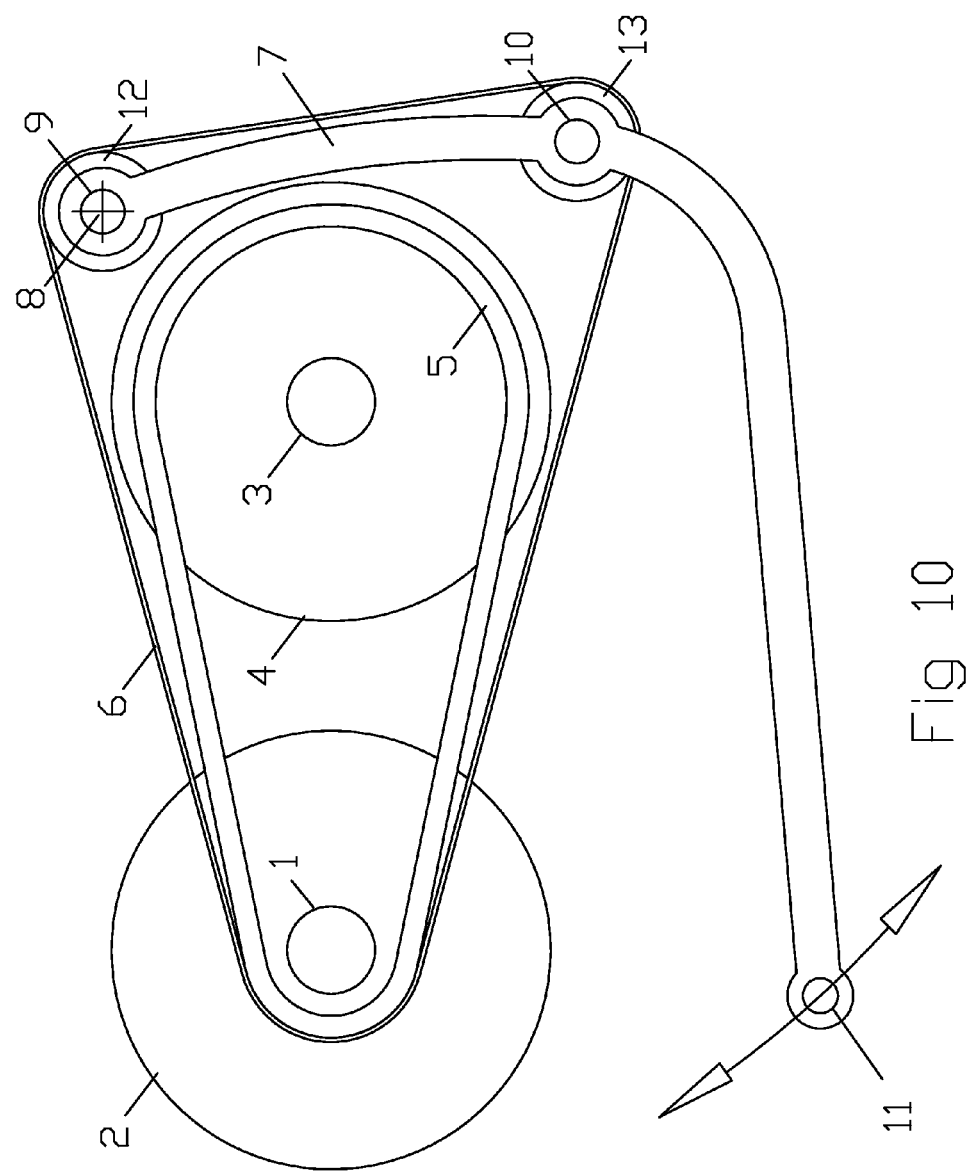
FIG. 10 is the first embodiment of the present invention in a first position.

FIG. 10 shows a first embodiment; the two pulley halves have been removed to unhide the back pulley halves, the V-belt 5 and the auxiliary belt 6; the lever 7 is at a position not allowing the variator to increase the effective diameter of the first (at left) pulley; the driver displaces (manually or otherwise) the lever 7. The transmission ratio depends on the angle of the lever 7 about the center 8 of the pivot 9. As the engine revs increase, the variator weights push the first pulley to a bigger effective diameter and the lever 7 anticlockwise. In FIG. 10 the transmission ratio is short.

Figure 11:
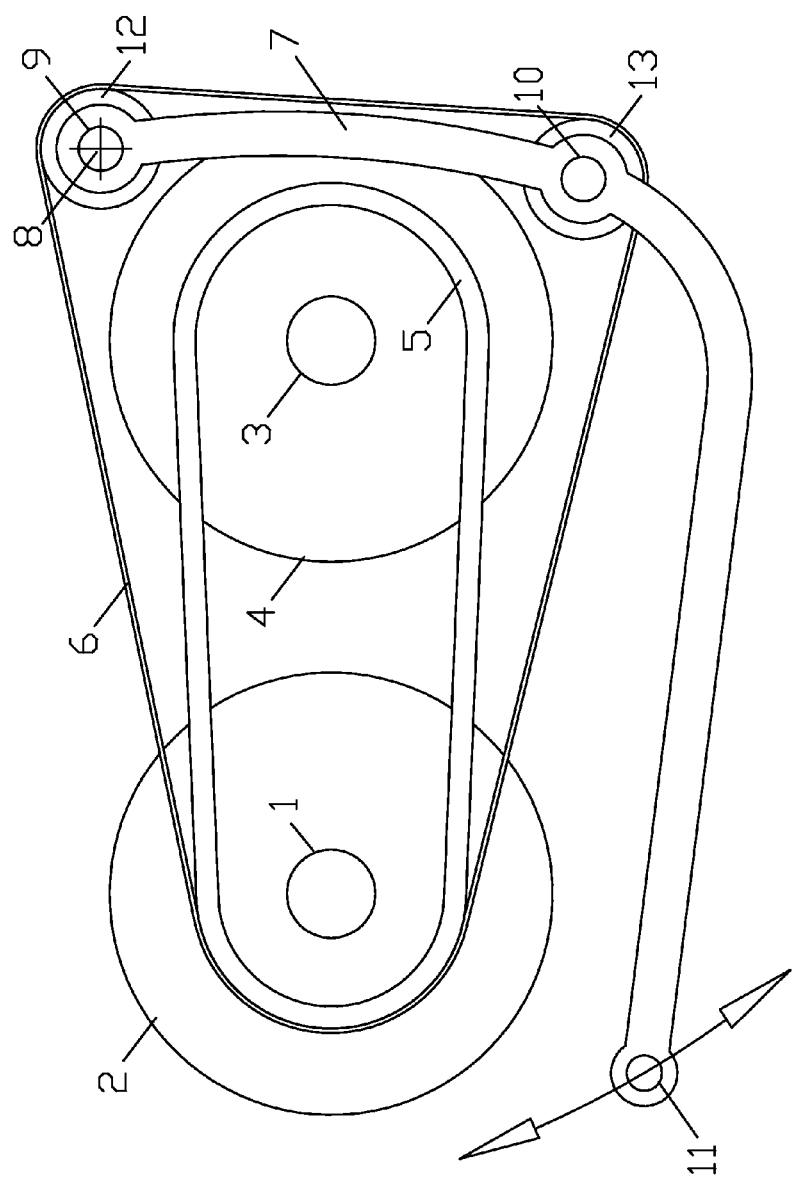
FIG. 11 shows the first embodiment in a second position.

FIG. 11 shows the first embodiment with the lever 7 at an intermediate position. The transmission ratio is longer.

Figure 12:
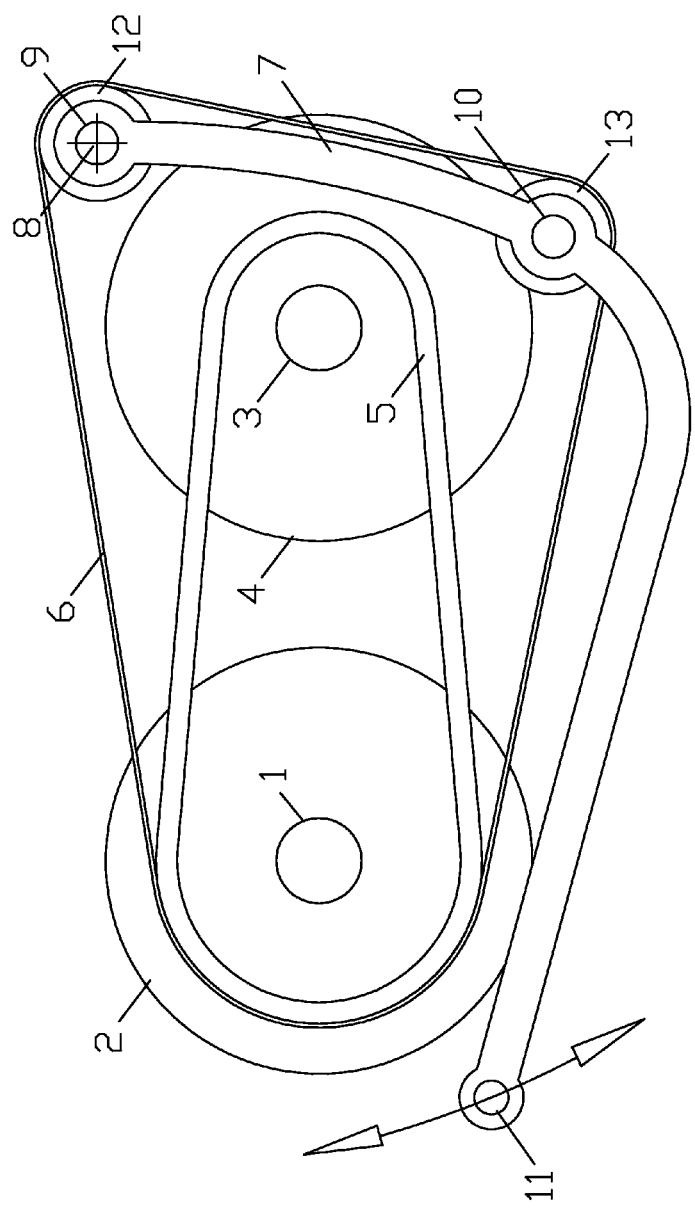
FIG. 12 shows the first embodiment in a third position.

FIG. 12 shows the first embodiment with the lever 7 at another position. The transmission ratio is even longer.

Figure 13:
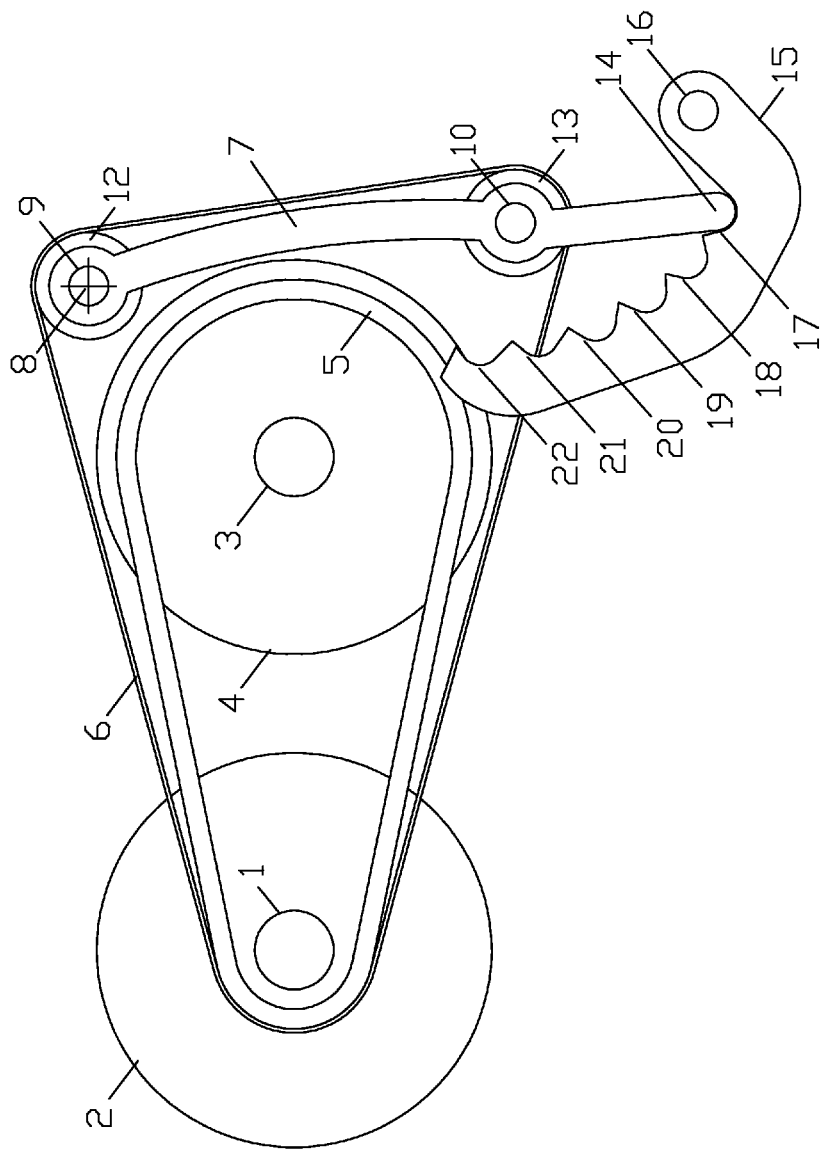
FIG. 13 is a second embodiment of the present invention at a short manual. "gear".

FIG. 13 shows a second embodiment. A pedal 15 blocks, by its cavity 17, the linkage (lever) 7 at a short transmission ratio (it is like having the first gear in a "manual" gearbox). As the revs of the engine increase, the variator (not shown) tries to increase the effective diameter of the first (left) pulley, however the auxiliary belt 6 and the lever 7 prevent this from happening (the shape of the cavity 17 is such that no matter how much the auxiliary belt 6 is tensioned and how strongly the lever 7 tends to rotate clockwise, the pedal 15 locks the lever 7 and blocks its motion). With a slight press of the pedal 15 downwards, the lever 7 is released, it rotates around the pivot 9 clockwise and after a while the next cavity 18 blocks it. With another slight press of the pedal 15, the lever 7 is again released to further rotate clockwise; then it gets blocked by the next cavity 19, and so on. The engine provides the energy for the shifting; the driver just triggers the transition to longer and longer transmission ratios. The resulting "vehicle speed vs engine revs" plot could be like the one shown in FIG. 7. A restoring spring (not shown) restores the lever 7 and keeps the auxiliary belt 6 in tension. By increasing the stiffness of the restoring spring, the characteristics curves of the CVT can be changed (as in the FIG. 9 for instance; i.e. with a stiff spring to restore the lever 7, the automatic operation of the CVT is modified because the variator has to force the effective diameter of the first pulley to increase, as usual, but it has also to force the lever 7 to rotate for some degrees clockwise extending the stiff spring). In order to return to the conventional automatic operation of the CVT, all that has to be done is to lock the pedal 15 at a position wherein the lever 7 moves free (away from the cuts 17 to 22). This way the CVT can turn "on the fly" to a conventional full-automatic CVT, then to a manual gearbox, then back to a full-automatic CVT, and so on.

Figure 14:
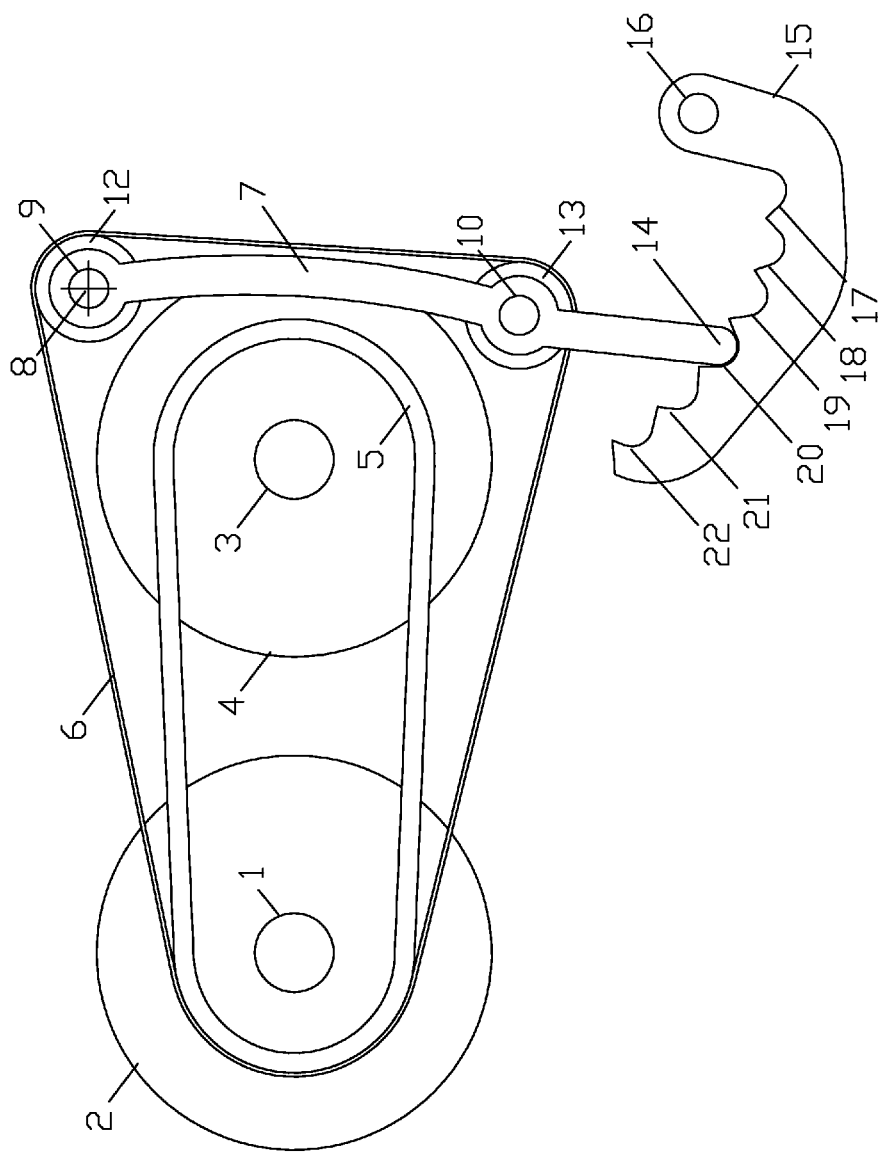
FIG. 14 shows the second embodiment at a longer manual "gear".

FIG. 14 shows the second embodiment at a longer "gear"; here the lever 7 is locked in the cavity 20 of the pedal 15 (it is like the fourth gear in a "manual" gearbox).

Figure 15:
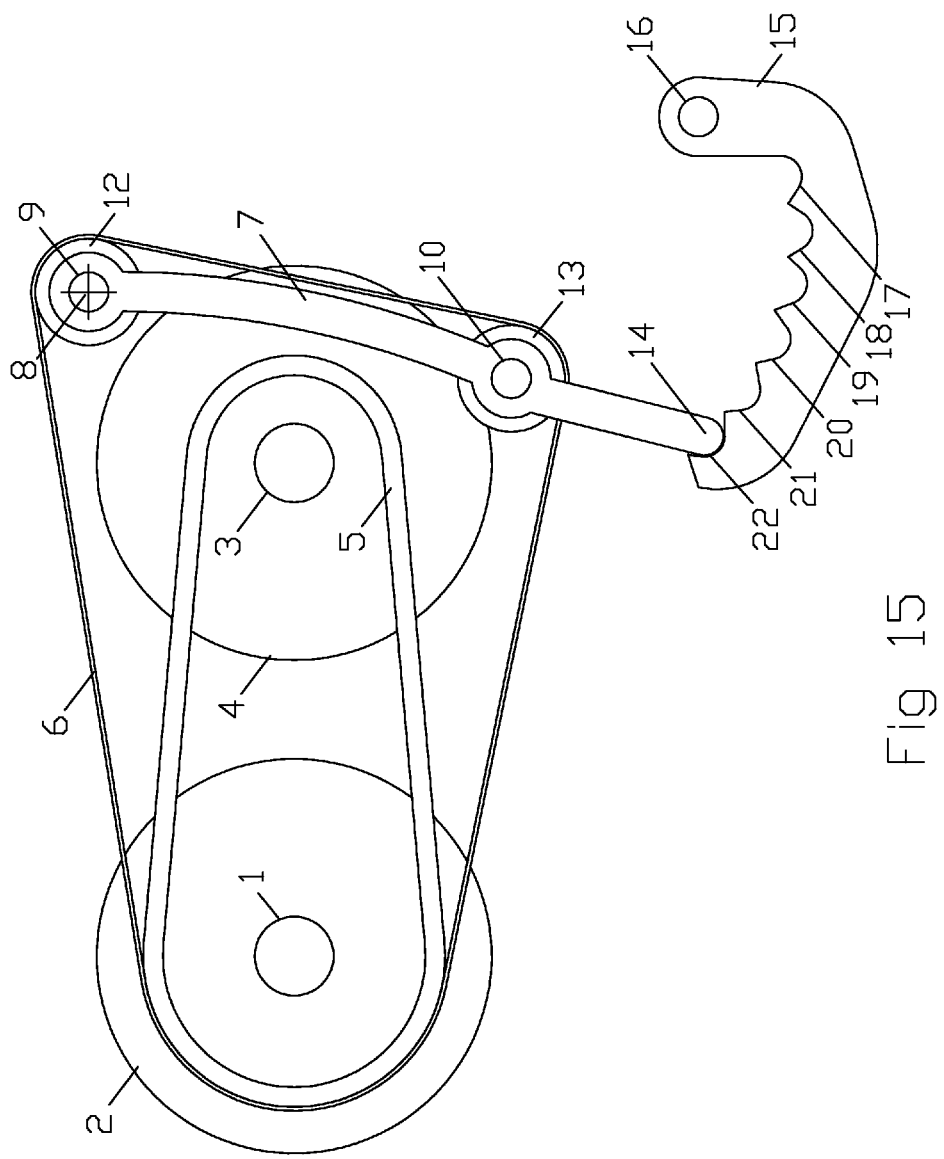
FIG. 15 shows the second embodiment at the longest manual "gear".

FIG. 15 shows the second embodiment at the longest manual "gear" (it is like having the sixth gear in a "manual" gearbox).

Figure 16:
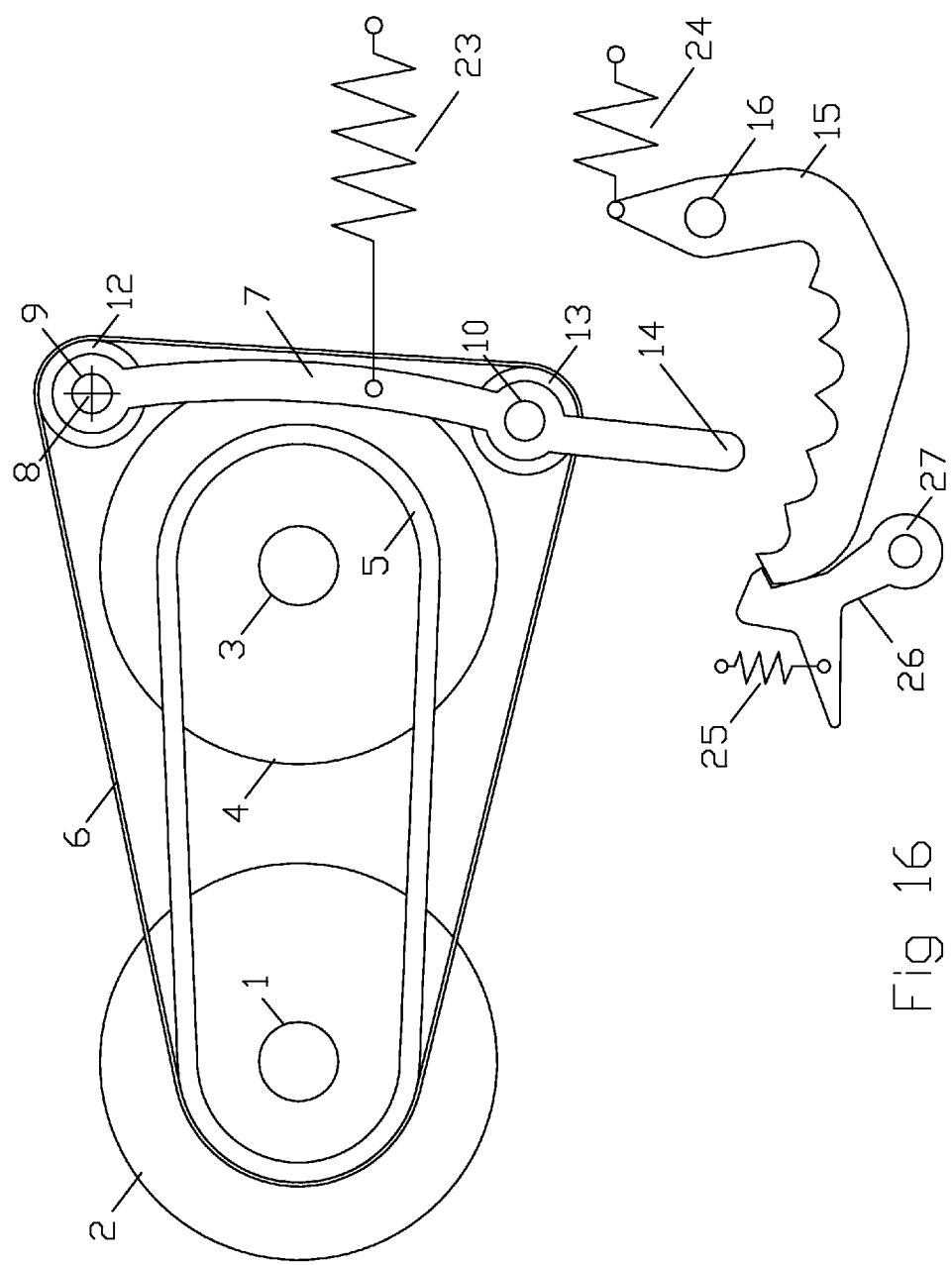
FIG. 16 shows the second embodiment at the automatic mode.

FIG. 16 shows the second embodiment at the automatic CVT mode. Here they are shown the restoring springs 23, 24 and 25 of the lever 7, of the pedal 15 and of the lock 26 respectively. The lock 26 blocks the pedal 15 at a position allowing the free motion of the lever 7. The CVT operates as an automatic conventional CVT (the "vehicle speed vs engine revs" plot can be like the one shown in FIG. 1). If the lock 26 is pushed anticlockwise, the pedal 15 is released and starts controlling the lever 7; the CVT starts working as a "manual gearbox" (for instance as shown in FIG. 7). When the pedal 15 is deeply pressed, it initially turns the lock 26 slightly anticlockwise and then the lock 26 blocks the pedal 15. The transmission returns again to the conventional automatic CVT mode.

Figure 17:
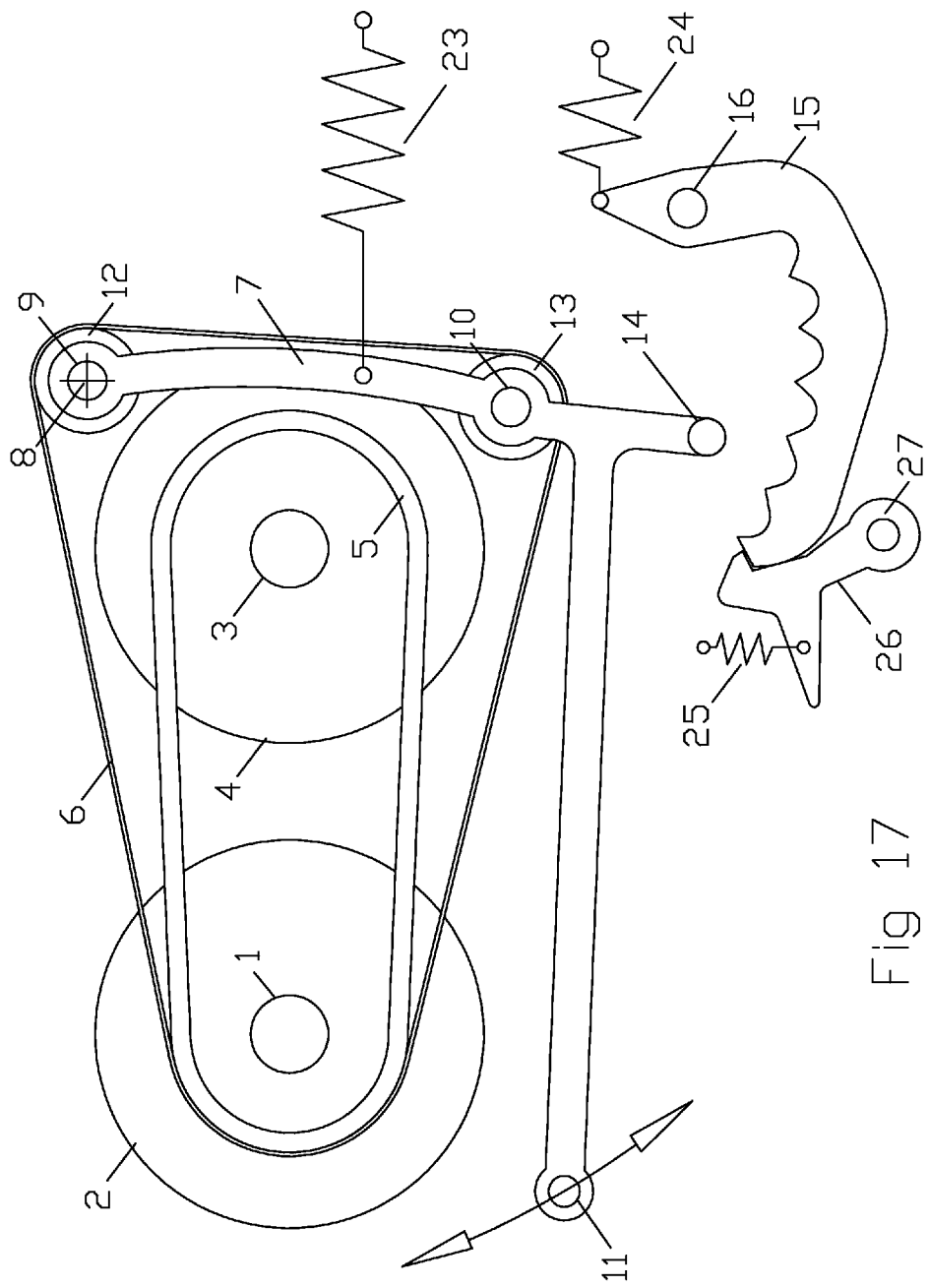
FIG. 17 is a third embodiment of the present invention combining the first and the second embodiments.

FIG. 17 shows a third embodiment that combines the first and the second embodiments. The driver has the choice to "manually" and continuously control the lever 7 (by stopping or pressing, with his foot for instance, the end 11 of the lever 7) and so to select any gear ratio (from the infinite available) he likes, even without any change of the vehicle speed (as in FIG. 5); the driver has also the choice to use the pedal 15 in order to manually shift between a number of distinct gears; the driver has also the choice to block the pedal 5 by the lock 26, and to release the lever 7, leaving the CVT to continuously vary the transmission ratio in the conventional automatic way.

Figure 18:
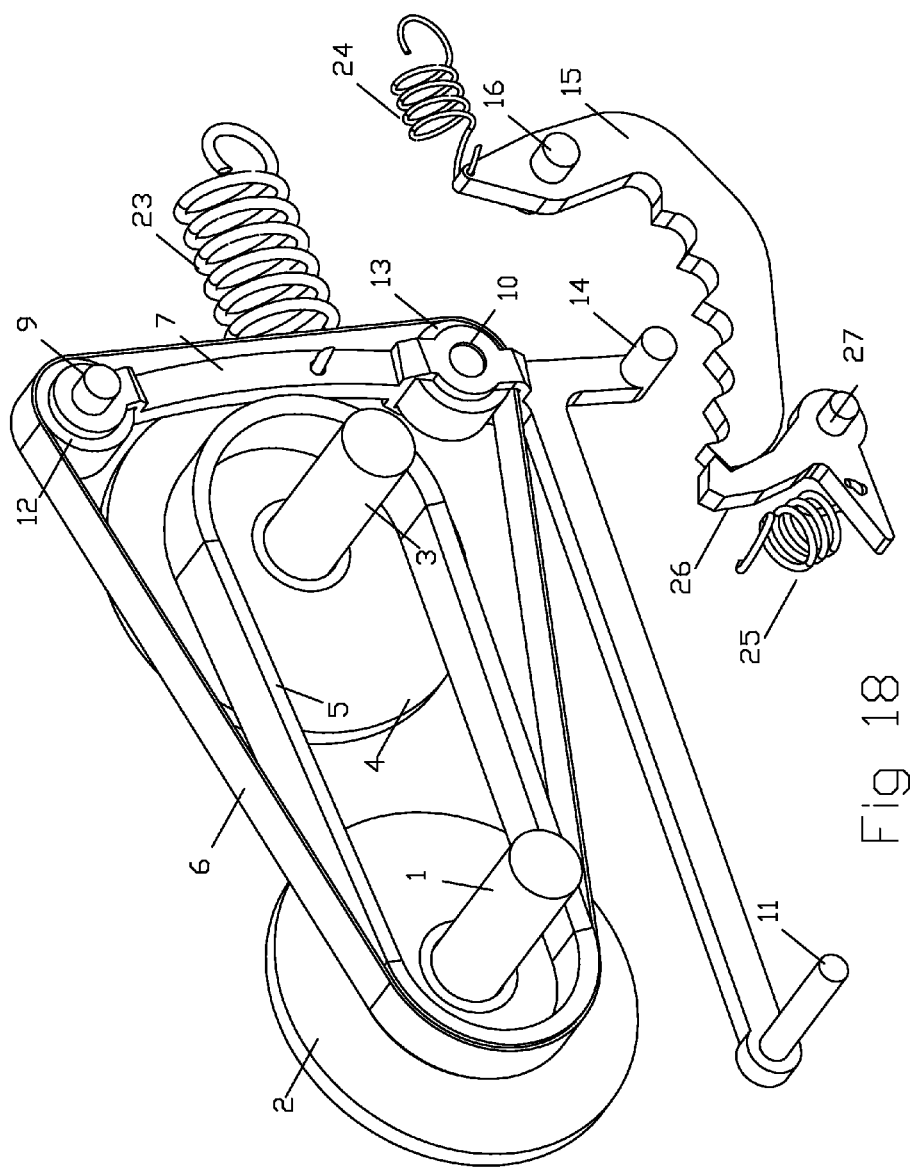
FIG. 18 shows the third embodiment from another viewpoint.

FIG. 18 shows the third embodiment from another viewpoint in 3-D.

Figure 19:
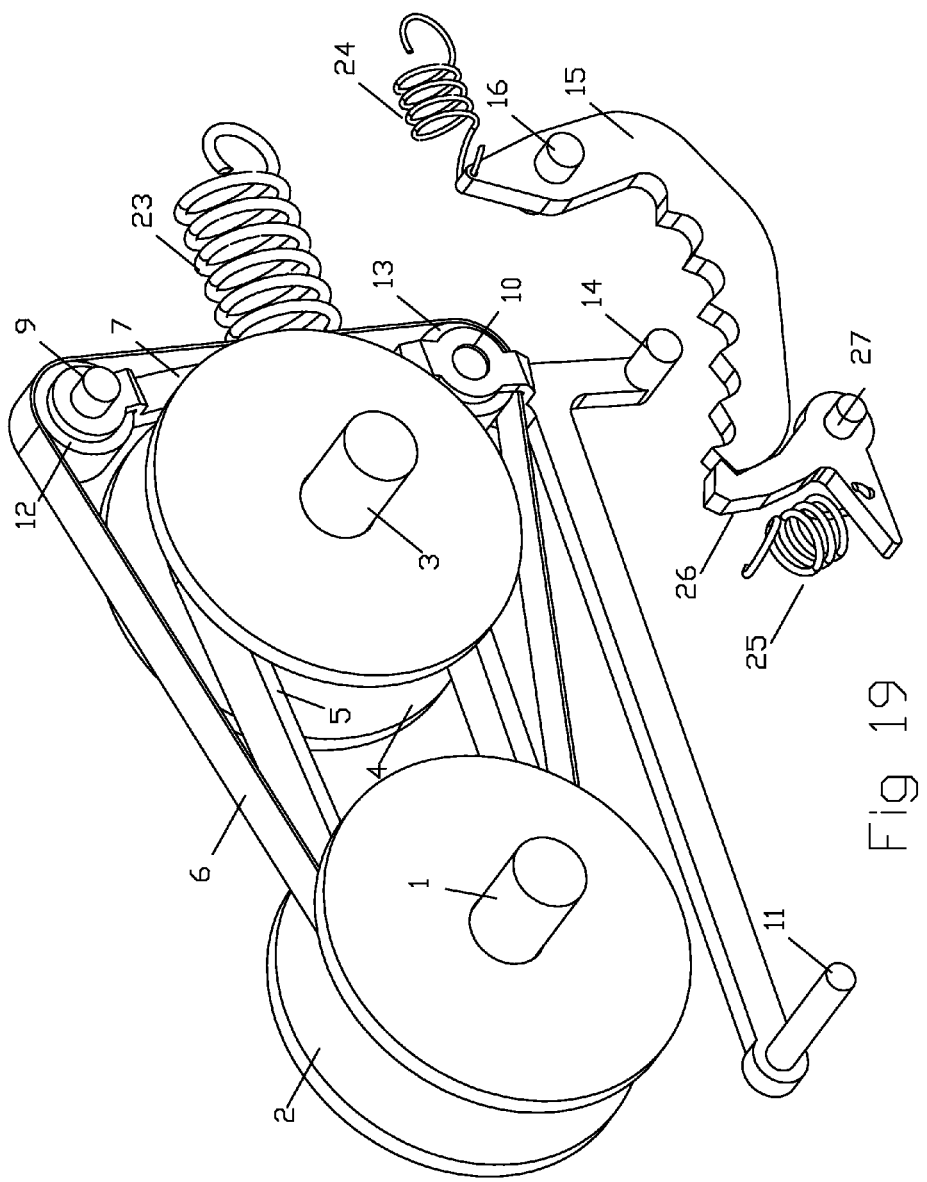
FIG. 19 shows what FIG. 18 with the two pulleys complete.

FIG. 19 shows in 3-D the third embodiment with the two halves of the pulleys in place.

Figure 20:
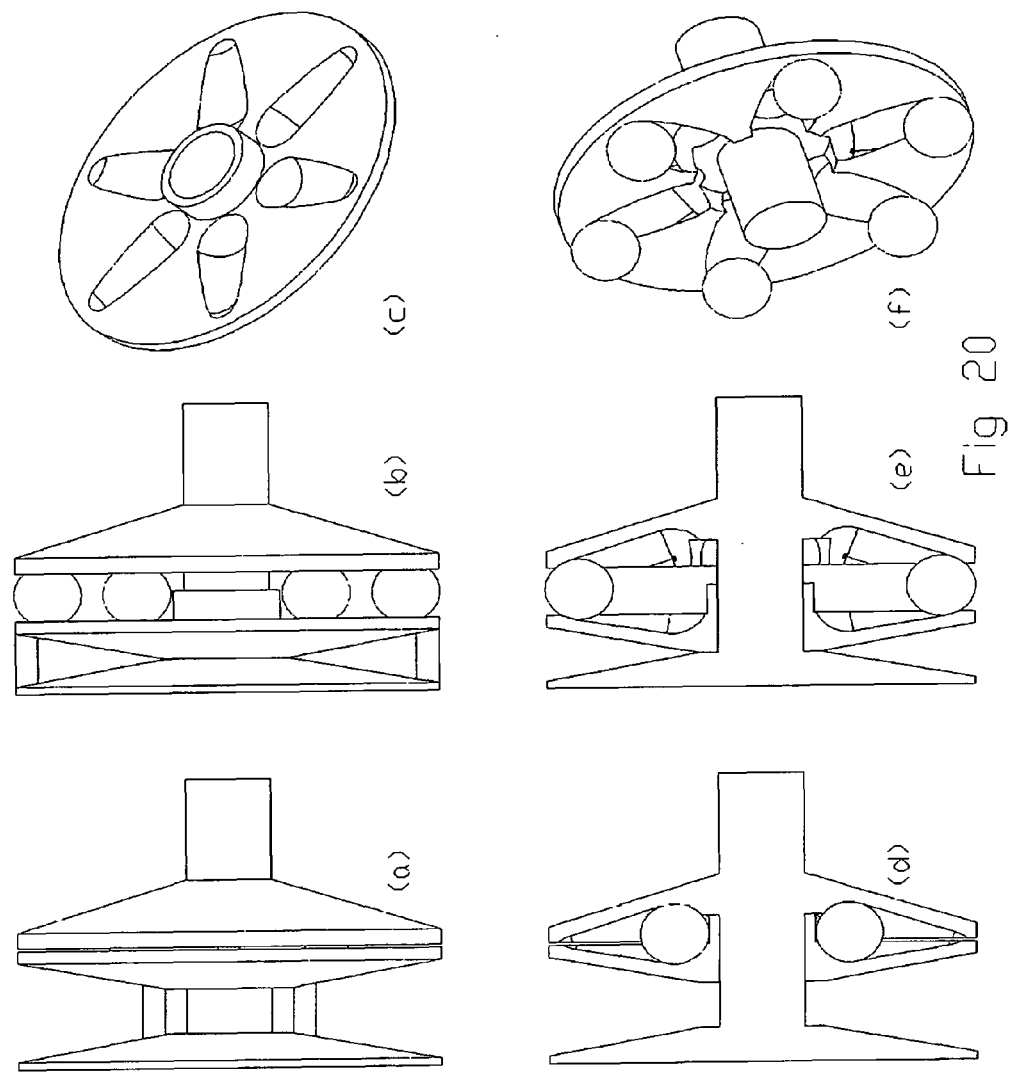
FIG. 20 shows a variator for CVT's.

FIG. 20 shows a variator for CVT's; the spheres that move along grooves made on the two "cover discs" are the weights; at low revs the spheres are close to the center and the effective diameter of the first pulley is small as shown at top left (FIG. 20(*a*)), and in section view at bottom left (FIG. 20(*d*)); at top left (FIG. 20(*a*)) it is also shown the V-belt in cut view; as the revs increase, the centrifugal force acting on the spheres makes them go away from the center, which in turn causes the effective diameter to increase as shown at top middle (FIG. 20(*b*)), and at bottom middle in section view (FIG. 20(*e*), wherein the spheres, and the grooves the sphere slide in, are better shown); at top middle (FIG. 20(*b*)) it is also shown the V-belt in cut view; the two discs, with the grooves and the spheres/weights of the variator, are shown at right (the disc at bottom right is sliced with the half of the pulley removed).

Figure 21:
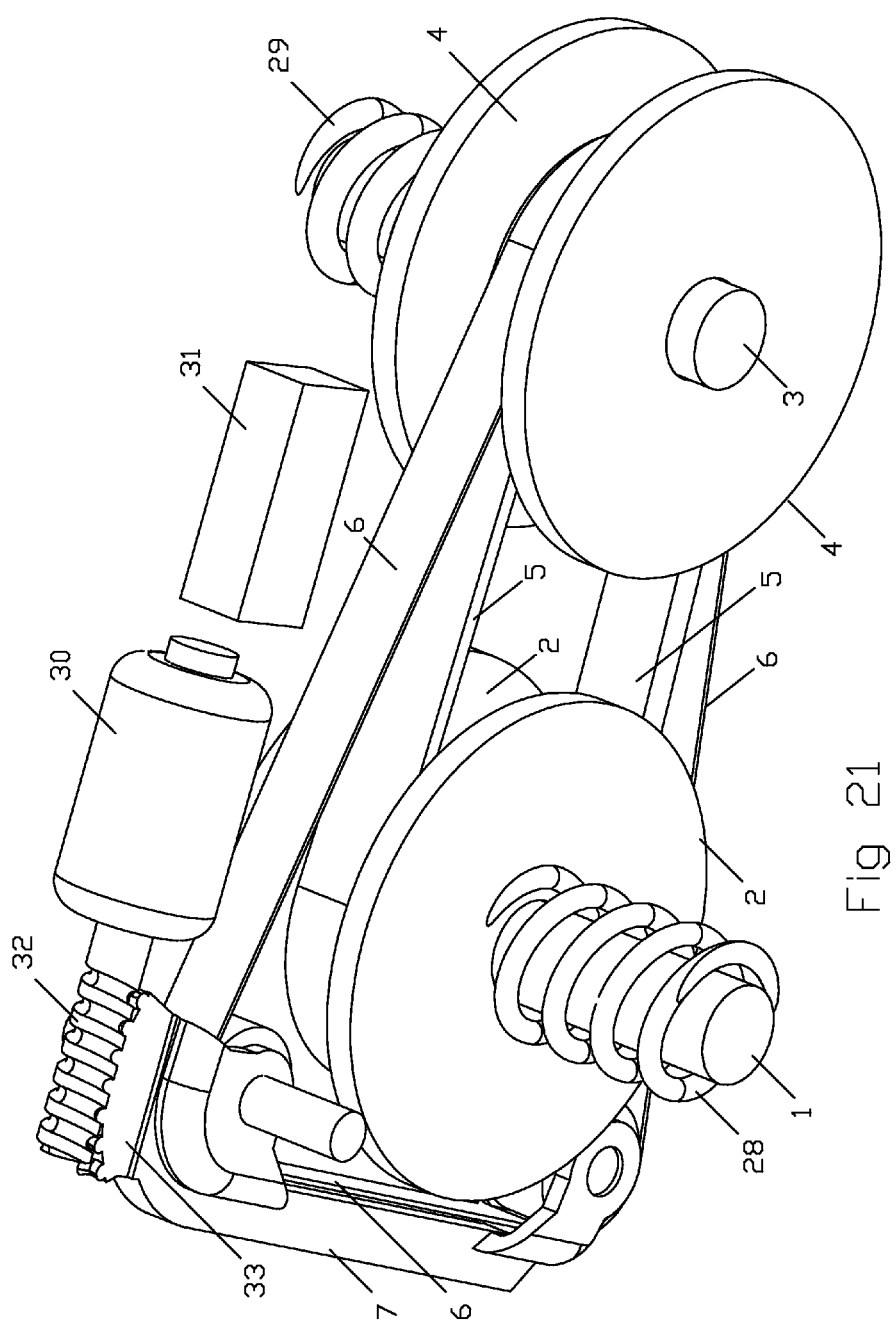
FIG. 21 is a fourth embodiment of the present invention.

FIG. 21 shows a fourth embodiment.

Figure 22:
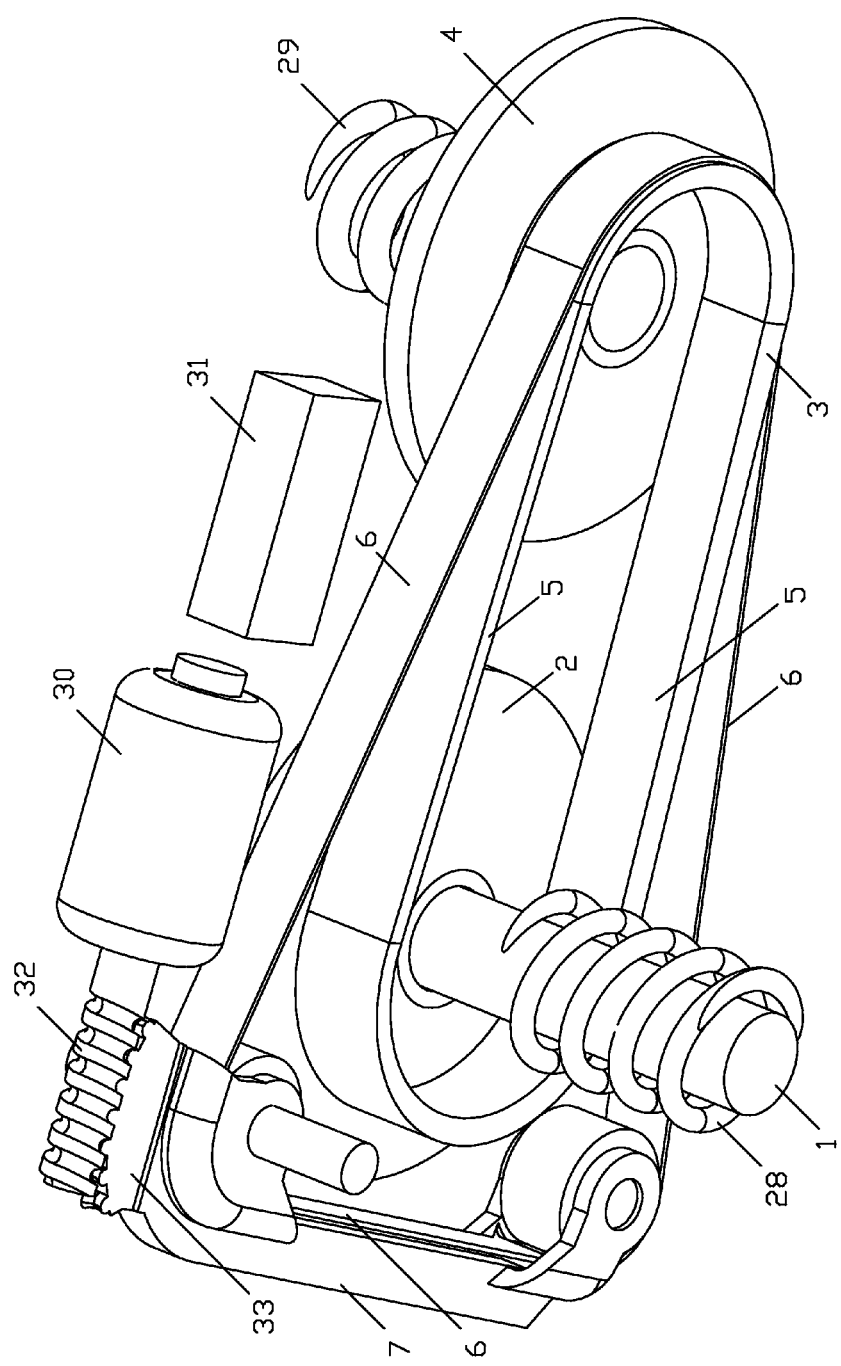
FIG. 22 shows what FIG. 21 after the removal of the two "front" conical halves of the pulleys.

FIG. 22 shows what FIG. 21 after the removal of the two "front" conical halves of the pulleys.

Figure 23:
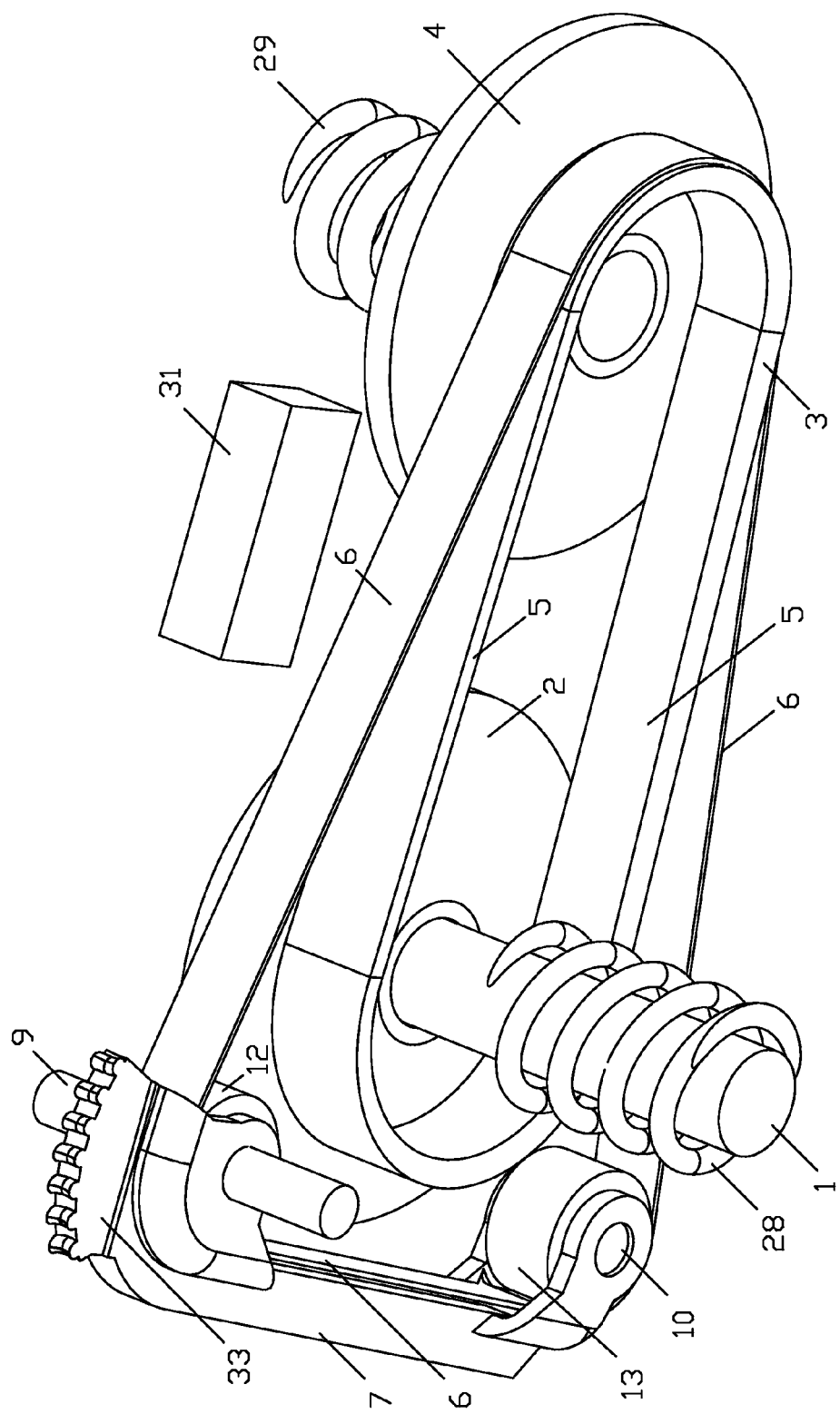
FIG. 23 shows what FIG. 22 after the removal of the servomotor.

FIG. 23 shows what FIG. 22 after the removal of the servomotor.

Figure 24:
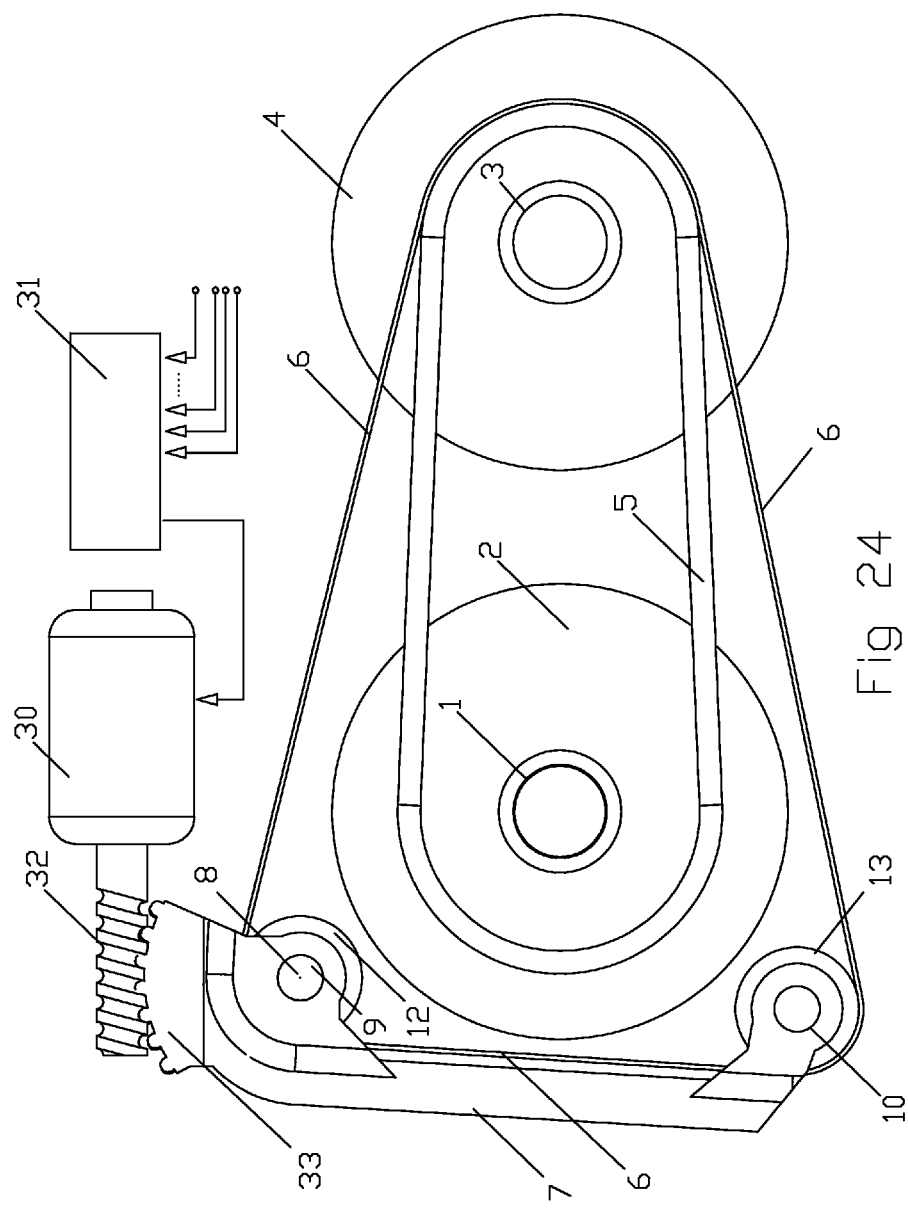
FIG. 24 shows the fourth embodiment from another viewpoint.

FIG. 24 shows the fourth embodiment from another viewpoint.

Figure 25:
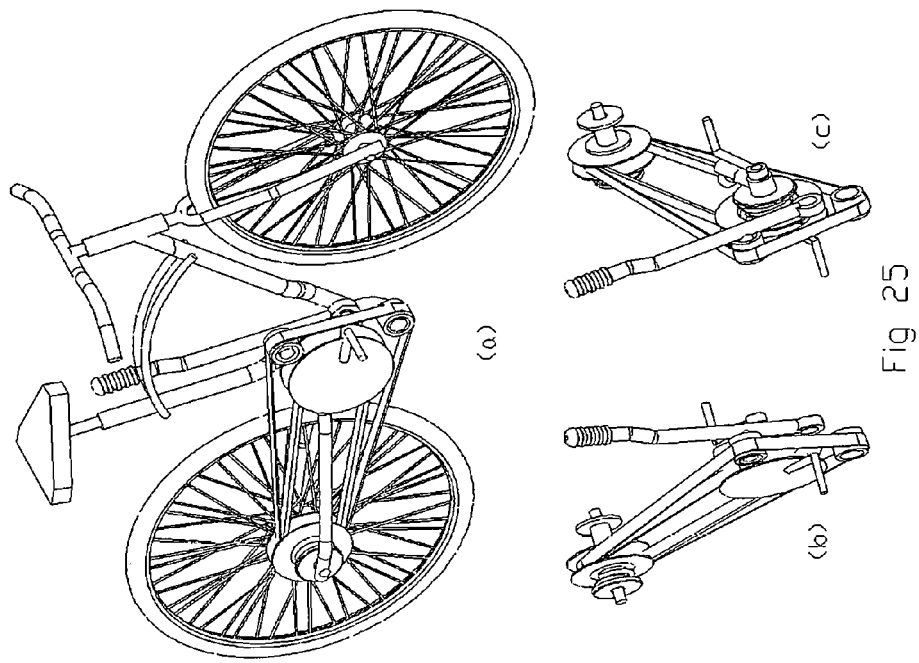
FIG. 25 is a fifth embodiment of the present invention in a short transmission ratio.

FIG. 25 is a fifth embodiment of the present invention applied on a bicycle at top (FIG. 25 (*a*)), and the continuously variable transmission system along, from two different viewpoints, at bottom (FIG. 25 (*b*) and FIG. 25(*c*)). The transmission ratio is short.

Figure 26:
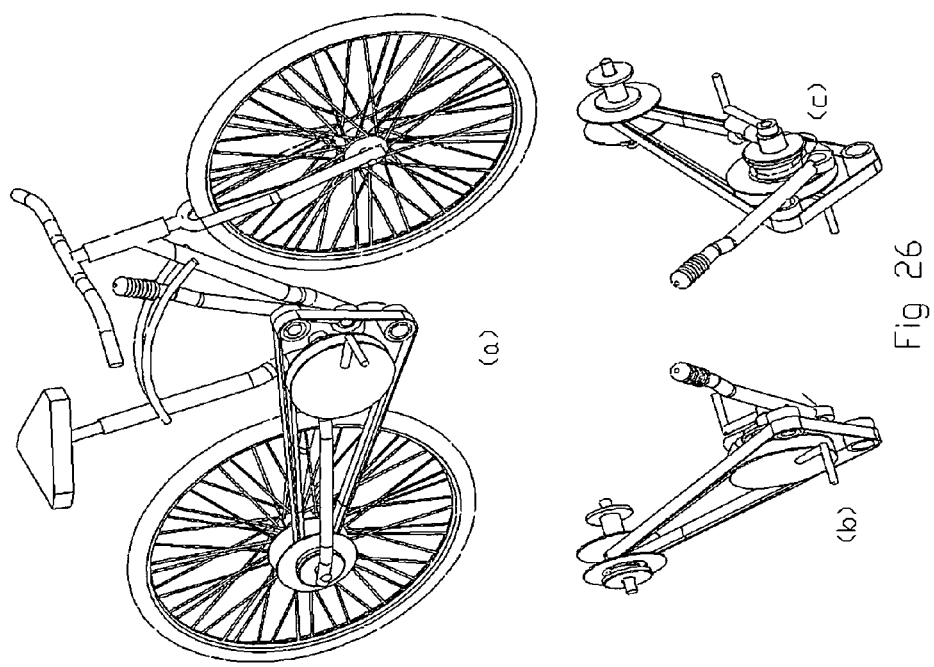
FIG. 26 shows the fifth embodiment in a long transmission ratio.

FIG. 26 shows the fifth embodiment in a long transmission ratio (overdrive): applied on a bicycle at top (FIG. 26(*a*)), and the continuously variable transmission system alone, from two different viewpoints at bottom (FIG. 26(*b*) and FIG. 26(*c*)).

Preferred Embodiments

In a first embodiment, FIGS. 10 to 12, 1 is a first shaft (it could be the crankshaft of the engine), 2 is the one half of the first pulley (a conical disc), 3 is a second shaft, 4 is the one half of the second pulley (a conical disc), 5 is the V-belt engaging the first pulley and the second pulley, 6 is the auxiliary belt, 7 is a lever pivotally mounted on the casing of the CVT at a pivot 9 having a center 8. The lever comprises a pin 10 and a handle 11. Two rollers 12 and 13 are rotatably mounted on the lever 7. The auxiliary belt 6 surrounds/embraces the V-belt 5 of the CVT at the first pulley side and the rollers 12, 13. The auxiliary belt 6 follows the motion of the V-belt 5.

The auxiliary belt can be any constant length flexible (preferably flat and thin) belt; the belt can be made of fibers; it can also be made of reinforced rubber; it can also be made of a closed steel band (which suits especially with CVT's having steel V-belt made of V-shaped steel plate member), etc.

The auxiliary belt 6 runs around the first pulley 2 (surrounding the V-belt 5) and around "free-running" pulleys/rollers 12 and 13 arranged on the lever 7 (or on a linkage in general).

Controlling the position of the lever 7, the transmission ratio provided by the CVT can be controlled externally.

In the simplest case the lever 7 is pivotally mounted on the casing of the CVT at a pivot/pin 9.

By blocking the lever 7 at an angle, the auxiliary belt 6 limits the effective diameter of the first pulley 2; the variator (not shown) tries to increase the effective diameter of the first pulley 2 as the engine revs increase, however the auxiliary belt 6 does not allow it to happen unless the lever 7 is released; then the variator increases the effective diameter of the first pulley 2, as usual; if the lever 7 is locked at another position, the effective diameter of the first pulley (and the resulting "gear ratio") stops increasing.

With the lever 7 released, the lever 7 follows the "commands" of the variator: as the effective diameter of the first pulley 2 increases, the auxiliary belt 6 forces the lever 7 to shift to another angle (or position). The CVT operates conventionally.

If during operation the lever 7 is pressed to rotate anticlockwise, the V-belt 5 is "directly" forced to get deeper into the first pulley 2 and the transmission ratio lowers. This resembles to the case wherein the stiffness of the second pulley spring (not shown) is substantially increased, however there is a substantial difference: in the one case the force applied on the V-belt is at the right direction (on the plane of the V-belt) and several times smaller than the additional force the spring of the second pulley should apply to the V-belt to cause the same result. In the second case the additional force from the second pulley spring is axial, i.e. normal to the plane of the V-belt, i.e. at the "wrong" direction; the V-belt is strongly pushed by the two halves of the second pulley 4 and due to the two conical halves of the second pulley, a force along the plane of the V-belt results to finally force the V-belt to get deeper into the first pulley; this increases the friction involved, loads the V-belt and causes rapid wear of the belt.

In a mode of operation, a brake (in the simplest case the foot of the driver) stops or releases selectively the lever 7.

With the lever 7 released, the speed of the vehicle increases progressively from, say, 20 Km/h to 80 Km/h while the revs of the engine remain at, say, 5000 rpm (the "gear ratio" increases progressively under the control of the variator). At 80 Km/h the CVT has reached its longest transmission ratio; from that point the speed is linearly proportional to the engine revs (for instance, 120 Km/h correspond to (120/80)*5000=7500 rpm).

If at 50 Km/h and 5000 rpm the driver locks the lever 7 (until then the lever 7 was automatically shifted clockwise due to its interaction with the auxiliary belt 6 and the V-belt 5 and the variator), then the speed is linearly proportional to the engine revs. For instance, at 80 Km/h the engine revs at (80/50)*5000=8000 rpm.

I.e. in the one case the vehicle accelerates from 50 Km/h to 80 Km/h with the engine revving constantly at 5000 rpm, in the second case the vehicle accelerates from 50 Km/h to 80 Km/h with the engine operating between 5000 and 8000 rpm (i.e. at revs wherein the engine typically provides more power).

Releasing completely the lever 7 at 80 Km/h and 8000 rpm, the variator restores the "normal" transmission ratio for this vehicle speed and the engine slows down at 5000 rpm. During the acceleration from the 80 Km/h to 100 Km/h the engine is revving between 5000 rpm and 6250 rpm.

Releasing for a little the lever at 80 Km/h and 8000 rpm, and blocking it again when the revs drop at 6400 rpm, the vehicle accelerates at "low gear" and the engine reaches the 8000 rpm when the speed of the vehicle becomes (8000/6400)*80=100 Km/h.

In this case during the acceleration of the vehicle from 80 Km/h to 100 km/h the engine was operating between 6400 rpm and 8000 rpm.

The driver can stop/brake the motion of the lever 7, i.e. the driver need not to provide energy for the motion of the lever (like having a "servo").

Only in the case a shorter, than the one already selected by the CVT, gearing is instantly necessary, only then the driver has to press the lever as required in order the auxiliary belt to force the V-belt to get deeper into the first pulley.

For instance, if at the 80 Km/h speed (with 5000 rpm) of the previous example the driver needs a shorter gearing (in order to decelerate with the engine, for instance, or in order to accelerate as quick as possible), he can press hard the lever 7 until, under the action of the auxiliary belt 6, the V-belt 5 to get deep in the first pulley 2 and the revs of the engine to rise to, say, 8000 rpm at the same 80 Km/h speed (it is like shifting to a lower gear in a manual gearbox).

According the previous, the driver can operate his vehicle either as usual (full automatic CVT controlled by the variator) or he can use shorter gear ratios when he needs, or desires, so.

A reasonable improvement is the modification of the variator in order to engage sooner (i.e. at lower engine revs) and to provide longer "gear ratios" (by heavier variator weights, for instance), as in FIG. 8. A long journey with 5000 rpm is exhausting as compared to the case wherein the same journey is made with the engine revving at only 3500 rpm. This way the vehicle in normal conditions runs quieter, at a better mileage, with lower emissions and less wear. And when the driver needs a shorter gearing, he uses the lever to vary the operation of the CVT.

In a second embodiment, FIGS. 13 to 15, a pedal 15 having cuts (17 to 22) is pivotally mounted to a pivot 16 of the casing; the CVT has turned to a manual gearbox having, in this specific case, 6 distinct gear ratios. To shift to a longer gear, the driver has just to push slightly the pedal 15 and then to release it. In FIG. 13 the first "manual" gear is selected, in FIG. 14 the fourth gear, and in FIG. 15 the sixth gear. When the driver wants to return to the automatic CVT mode, the pedal 15 is deeply pressed and gets locked at a position wherein it does not interfere with the end 14 of the lever 7, as in FIG. 16.

In a third embodiment, FIGS. 17 to 19, the driver has three different modes to operate the CVT: either as a conventional automatic CVT (the pedal 15 is blocked by the lock 26 and the lever 7 is released to move as the variator commands), or an infinitely variable "manual" gearbox controlled by the "continuous" angular displacement of the lever 7 about its pivot 9 (in this case the pedal 15 does not interfere with the lever 7), or as a manual gearbox having a number of distinct gear ratios selected by pressing properly the pedal 15.

In a fourth embodiment, FIGS. 21 to 24, the CVT comprises: a first shaft 1;

a first pulley 2 comprising two conical halves on the first shaft 1, at least the one conical half of the first pulley 2 being axially movable with respect to the first shaft 1;
a first spring 28 pushing the two conical halves of the first pulley close to each other;
a second shaft 3;
a second pulley 4 comprising two conical halves on the second shaft 3, at least the one conical half of the second pulley 4 being axially movable with respect to the second shaft 3;
a second spring 29 pushing the two conical halves of the second pulley 4 close to each other;
a V-belt 5, the V-belt 5 is engaging the first and second pulleys (2, 4) and is transferring power between the first and second shafts (1, 3), the V-belt 5 forces the conical halves of the first and second pulleys (2, 4) to open against the counteracting first and second springs (28, 29), respectively, the second spring 29 is adequately stiff to restore the system of the two pulleys (2, 4), of the V-belt 5 and of the springs (28,29) to the condition wherein the two conical halves of the second pulley 4 are close to each other and an effective diameter of the second pulley 4 is maximized;
an auxiliary belt 6, the auxiliary belt 6 abuts on an external surface of the V-belt 5 at the second pulley 4 side;
a linkage 7, the linkage 7 supports the auxiliary belt 6 and, through the auxiliary belt 6, the linkage 7 can force the V-belt 5 to run closer to the second shaft 3 keeping the two conical halves of the second pulley 4 apart from each other so that an effective diameter of the second pulley 4 lowers;
a servomotor 30;
a control unit 31, the control unit 31 based on various operational parameters displaces, through the servomotor 30, the linkage 7 and varies the transmission ratio between the first shaft 1 and the second shaft 3 as required.

The engine can drive the first shaft 1 (and so the wheels are driven by the second shaft 3); alternatively, the engine can drive the second shaft 3 (and so the wheels are driven by the first shaft 1).

The control unit 31 receives signals from various sensors (like the speed of the vehicle, the throttle opening, the cooling temperature, the revs of the engine, the mode selected by the driver—like "touring" mode, "sport" mode, "green" mode—the air temperature, the altitude etc) and controls accordingly the servomotor 30. The servomotor 30, under the control of the control unit 31, rotates properly the worm gear 32, which is engaged with the gear 33 of the lever 7; the lever 7 rotates for a few degrees and, depending on the direction of the rotation of the lever 7, the auxiliary belt 6 either forces the V-belt 5 to go deeper into the second pulley 4 (causing the reduction of the effecting diameter of the second pulley 4), or releases at a degree the V-belt 5 that, under the action of the second spring 29, allows the two conical halves of the second pulley to close to each other causing the increase of the effective diameter of the second pulley 4.

This embodiment is rid of a "centrifugal variator", so it is rid of the limitations a centrifugal variator introduces.

The available range of modes of operation extends and covers the area below the basic "revs vs. speed" curve of the plots shown in FIGS. 1 to 9.

As compared to the "rid of centrifugal variator" state-of-the-art CVT's (like the CVT of the Suzuki Burgman scooter, or like the automobile V-belt CVT's) in the present CVT the rotation angle of the worm gear (like: 1570 degrees, or 400 degrees etc) defines the transmission ratio, making optional the use of "position sensors" that inform the control unit for the instant effective diameters of the pulleys.

In a fifth embodiment, FIGS. 25 and 26, the conventional transmission system of a bicycle is replaced by the continuously variable transmission system of this invention.

The drive pulley (that with the pedals) replaces the front sprocket of the bicycle, the driven pulley replaces the rear sprocket of the bicycle and the V-belt replaces the chain. Each pulley has its own "restoring" spring. An auxiliary belt rides around, and abuts on, the V-belt; the auxiliary belt rides, also, around rollers on a control lever.

When the control lever is released, the system restores at its shortest transmission ratio (the two halves of the drive pulley are apart from each other). The rider by displacing the control lever varies continuously the transmission ratio. The rider starts pedaling as usual. When the rider needs a shorter (or longer) transmission ratio, the rider shifts (or releases) the control lever, the control lever rotates for a few degrees and then is secured till the next gearshift.

In comparison to a state-of-the-art bicycle transmission (21 discrete gear-ratios, 3 drive sprockets, 7 driven sprockets, a chain, a tension mechanism, a pair of control levers—and cables—for the selection of the desirable gear-ratio), the present system (fifth embodiment) besides providing infinite transmission ratios, it is also cleaner (no lubrication is required), quieter, smoother at operation, way smoother at gear-shifts (the transition from gear-ratio to gear-ratio happens without disengaging the pedals from the rear wheel: uninterruptible power from the feet of the rider goes to the rear wheel even during the gear-shifting, while in a conventional bicycle, the passage from gear-ratio to gear-ratio comes together with the disengagement of the rear wheel from the pedals and the interruption of the power flow from the feet of the rider to the rear wheel; it is also way easier and controllable for the rider (the longer the transmission ratio he/she needs, the more the lever is displaced forward).

This invention can be used in every V-belt CVT.

It is a simple, mechanical, lightweight, cheap and reliable mechanism that actually adds no friction to the CVT.

For instance, in the state-of-the-art V-belt car CVT's (wherein the V-belt is made of steel members with steel bands connecting them), the proposed simple mechanism can replace the hydraulic system (to rid the transmission from the related with the hydraulic system problems like the cost, the weight, the complication, the added friction etc) while its functionality is equivalent, if not better.

In a drill or a milling machine, the user can instantly change the transmission by displacing angularly a control lever.

Even in domestic appliances, like in a mixer, the present invention is easily applicable. The rotation of a lever for a few degrees varies continuously the transmission ratio from a minimum to a maximum.

Although the invention has been described and illustrated in detail, the spirit and scope of the present invention are to be limited only by the terms of the appended claims.

The invention claimed is:

1. A continuously variable transmission comprising: a first shaft (1); a first pulley (2) comprising two conical halves on the first shaft (1), at least one conical half of the two conical halves of the first pulley (2) being axially movable with respect to the first shaft (1); a second shaft (3); a second pulley (4) comprising two conical halves on the second shaft (3), at least one conical half of the two conical halves of the second pulley (4) being axially movable with respect to the second shaft (3); a V-belt (5) wrapped around said first and said second pulleys (2, 4), the V-belt (5) transferring power between the first and the second shafts (1, 3) at a transmission ratio that is determined by a first radius defined as a distance from a center of the first pulley to a portion of the V-belt in direct contact with the first pulley and a second radius defined as a distance from a center of the second pulley to a portion of the V-belt in direct contact with the second pulley; an auxiliary belt (6) wrapped around the V-belt (5); a control mechanism (7, 13) for shifting the auxiliary belt (6), whereby the shifting of the auxiliary belt (6) by the control mechanism (7, 13) changes the first radius and the second radius of the two pulleys (2, 4) varying controllably of the transmission ratio.

2. A continuously variable transmission as in claim 1 wherein: the control mechanism (7, 13) is a lever (7) comprising a roller (13), the auxiliary belt (6) being wrapped around the roller (13).

3. A continuously variable transmission as in claim 1 wherein: the control mechanism (7, 13) is a lever (7) angularly displaceable about a pin (9), the lever (7) having a roller (13) arranged eccentrically relative to the pin (9), the auxiliary belt (6) being wrapped around the roller (13), whereby varying an angular displacement of the lever (7) about the pin (9) varies the transmission ratio.

4. A continuously variable transmission as in claim 1, further comprising a lock mechanism (15, 14) by which the control mechanism (7, 13) can selectively be locked at a number of positions, each said number of positions providing a discrete transmission ratio.

5. A continuously variable transmission as in claim 1, further comprising a lock mechanism (15, 14) by which the control mechanism (7, 13) can selectively be locked at a number of positions, each said number of positions providing a discrete transmission ratio, whereby the control mechanism (7, 13) can be disengaged from the lock mechanism (15, 14).

6. A continuously variable transmission as in claim 1, further comprising a variator providing automatic control over the transmission ratio.

7. A continuously variable transmission as in claim 1, further comprising: a variator providing automatic control over the transmission ratio; a lock mechanism (15, 14) by which the control mechanism (7, 13) can selectively be locked at a number of positions, each said number of positions providing a discrete transmission ratio, the control mechanism (7, 13) can be disengaged from the lock mechanism (15, 14), so that the transmission ratio can vary either automatically and continuously under the control of the variator, or manually and continuously under the control of the control mechanism (7, 13), or manually and in steps using the lock mechanism (15, 14), or automatically and continuosly under the control of the variator in combination with the control mechanism (7, 13).

8. A continuously variable transmission as in claim 1, wherein: the auxiliary belt (5) is a steel band.

9. A continuously variably transmission as in claim 1, further comprising: a first spring (28) connected to the first pulley (2) and configured to bias the two conical halves of the first pulley axially toward each other; a second spring (29) connected to the second pulley (4) and configured to bias the two conical halves of the second pulley axially toward each other; a servomotor (30); a control unit (31).

10. A continuously variable transmission as in claim 1, further comprising: a first spring (28) connected to the first pulley (2) and configured to bias the two conical halves of the first pulley axially toward each other; a second spring (29) connected to the second pulley (4) and configured to bias the two conical halves of the second pulley axially toward each other.

* * * * *